May 16, 1939.  C. J. BOCK  2,158,320
POWER-DIVIDED TRANSMISSION
Filed Oct. 7, 1937   3 Sheets-Sheet 2

Inventor
Carl J. Bock
By
Blackmore, Spencer & Smith
Attorneys

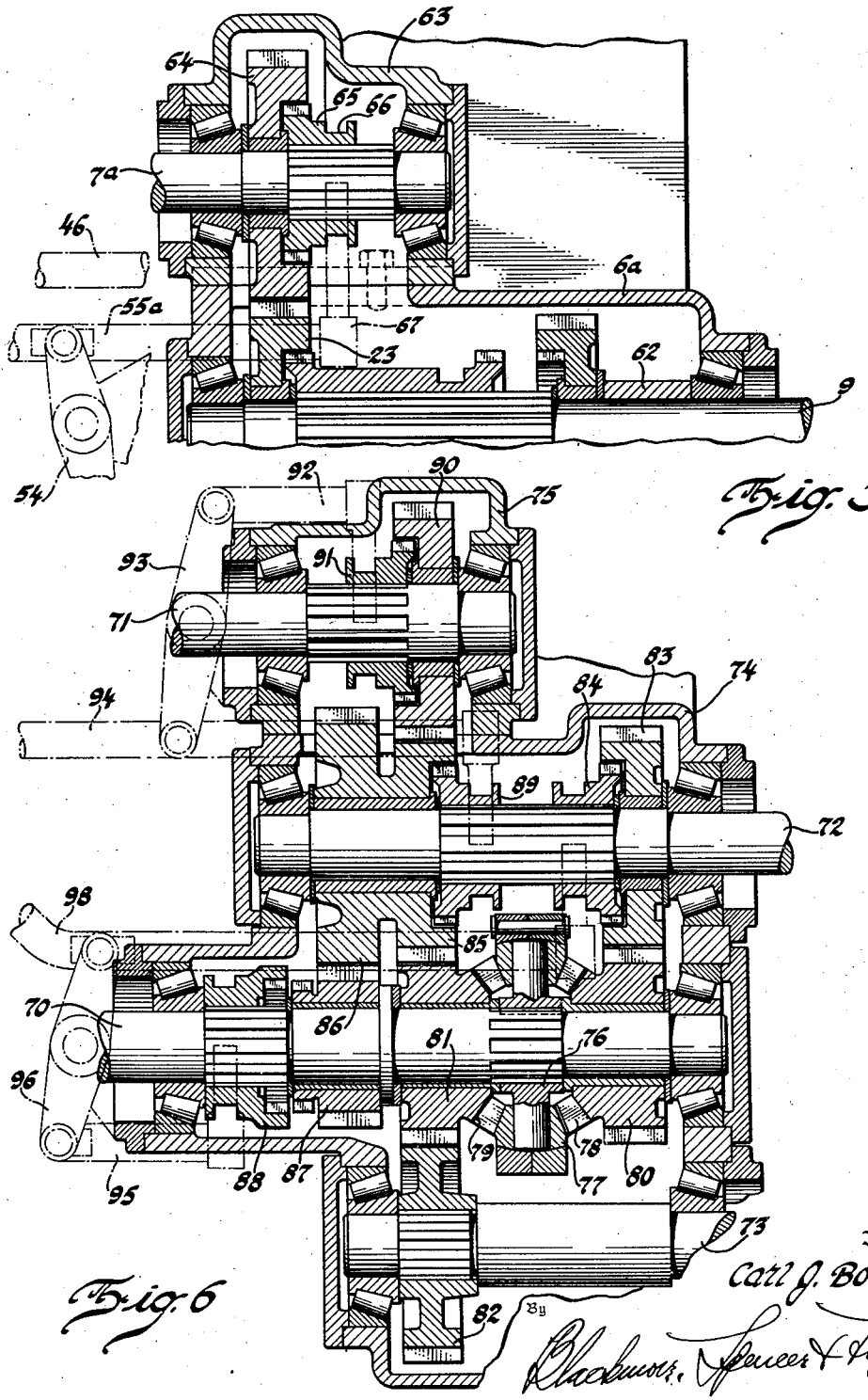

Patented May 16, 1939

2,158,320

UNITED STATES PATENT OFFICE 2,158,320

POWER-DIVIDED TRANSMISSION

Carl J. Bock, Birmingham, Mich., assignor to Yellow Truck & Coach Manufacturing Company, Pontiac, Mich., a corporation of Maine Application October 7, 1937, Serial No. 167,686

7 Claims. (Cl. 74—326)

This invention relates to power operated vehicles of the multiple drive axle type and more particularly to the mechanism for dividing the application of power between the axles. The structure is especially adapted for use with commercial and military trucks which encounter various operating conditions including the extremes of light load high speed operation on good roads and heavy load low speed operation on very bad roads, the latter requiring more pulling power.

An object of the invention is to provide mechanism for the transmission of power from a common source to several driving axles incorporating high and low speed ranges with optional differential drive. The intention is that the device be auxiliary to the conventional change speed mechanism of the motor vehicle, although for some types of work it could serve alone as the variable speed mechanism. For the more unfavorable driving condition, as for example, where one or more sets of road wheels ride in soft earth, the drive transmitting mechanism can be set to lock out the differential action and divide the power equally among the axles. Otherwise differential drive is employed to reduce scrubbing and rapid wear of the tire tread caused by differences in road contour and tire radii.

Figure 1:
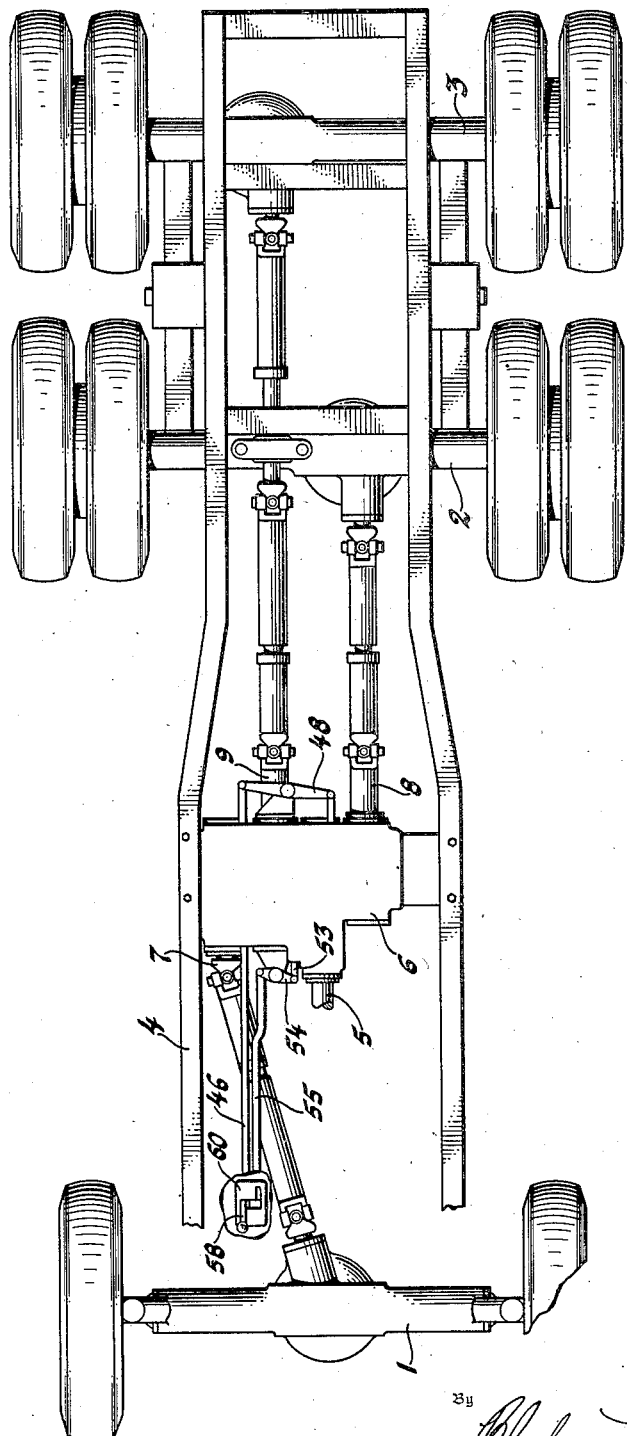
Figure 2:
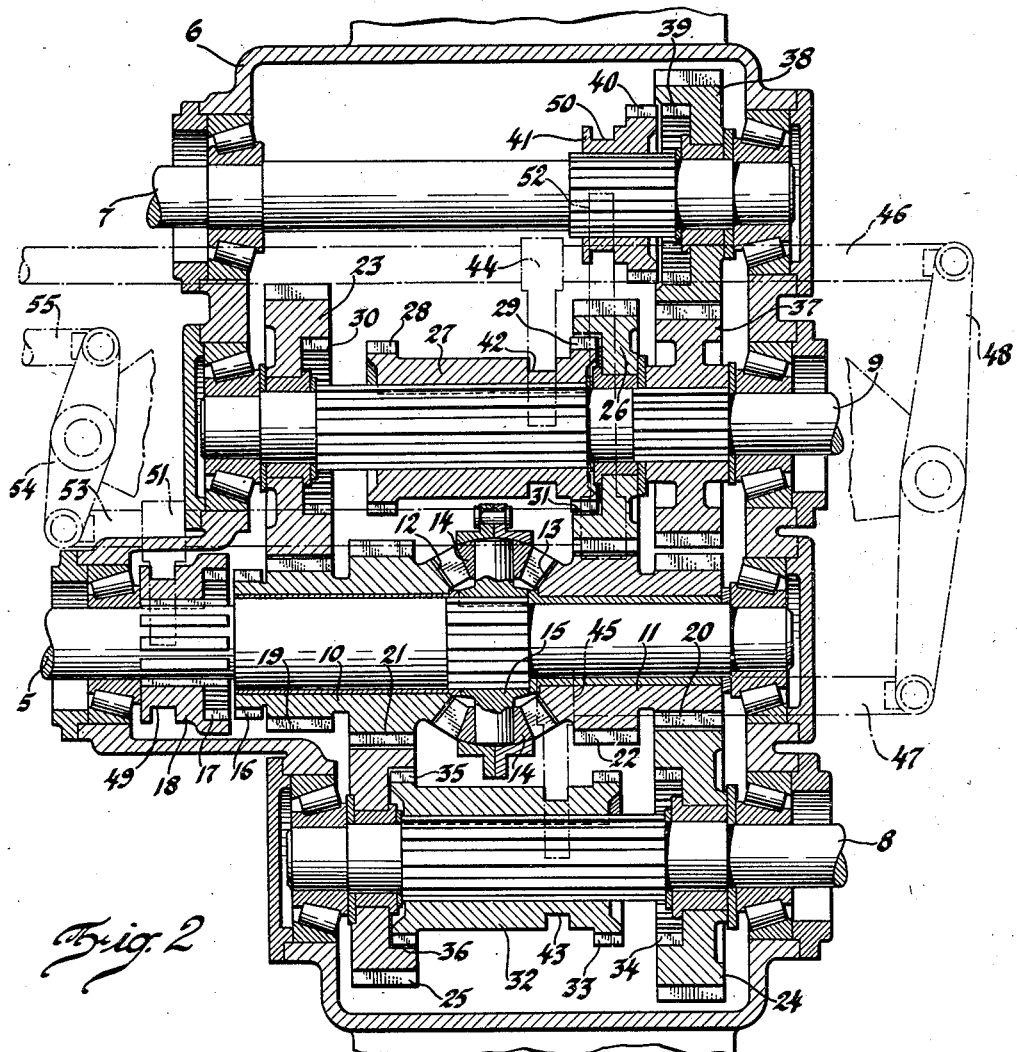
Figures 3, 4:
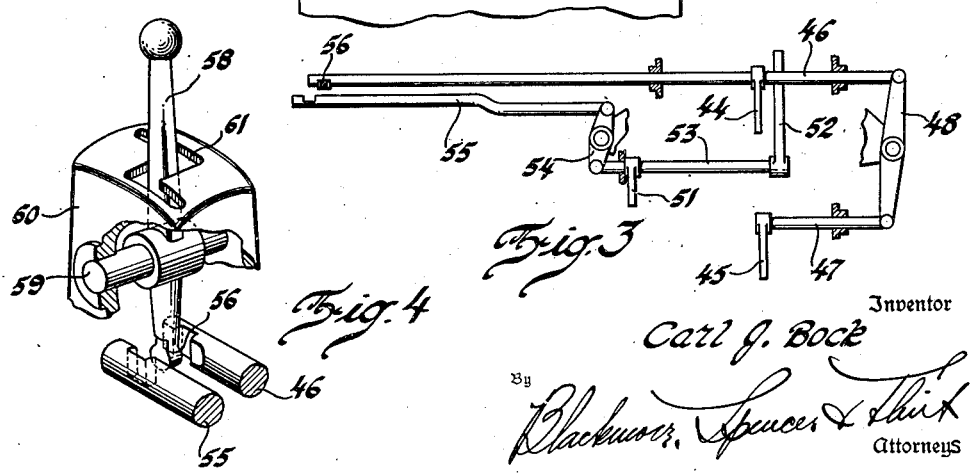

For a more complete understanding, reference may be made to the accompanying drawings wherein Figure 1 is a plan view showing a portion of a motor vehicle and the operating connections for three drive axles; Figure 2 is a horizontal sectional view through the auxiliary gear box; Figure 3 shows the control rod and shifter forks through which drive relations are established; Figure 4 is a detail perspective view of the hand shift lever and its mounting, and Figures 5 and 6 are sectional views showing modified forms of the gearing mechanism.

The road wheel and axle assemblies to be used can be of any suitable construction and the drive can be through either four or six wheels. In the four wheel drive combination wherein two drive axles each have two wheels, according to the preferred embodiment, power is transmitted differentially between the axles in either high or low speed settings or without differential action in low speed setting. For the purpose of disclosure the six wheel drive is illustrated and in this arrangement all six wheels are driven only to take care of the more difficult situations with the transmission set in the low speed range and the differential cut out of action. Under more favorable conditions power is transmitted through the differential to only four wheels in either high or low speed ranges.

The customary arrangement of the axles for a six wheel vehicle is shown in Figure 1 wherein a steering drive axle 1 is located at the front and a pair of tandem drive axles 2 and 3 are located at the rear. The chassis frame 4 is supported upon the axles through any well known type of spring suspension and serves to mount the body and engine in the conventional manner. The power plant, omitted from the drawings for the sake of simplicity, may be considered as comprising the usual engine, clutch and change speed gear box, the output shaft of which is joined to the input shaft 5 of the auxiliary gear box 6 enclosing the mechanism through which power is divided between and drives the spaced output shafts 7, 8 and 9 operably connected by propeller shafts with the differential drive units of the axle assemblies 1, 2 and 3, respectively.

Referring now to Figure 2, it will be seen that the several shafts 5, 7, 8 and 9 are rotatably mounted at opposite ends in suitable bearings in the front and rear walls of the gear box 6 and carry intermeshing gears for the division and transmission of power in selected relations. The gearing assembly on the input shaft 5 includes a pair of spaced gear elements 10 and 11, the adjacent faces of which carry bevel gear teeth 12 and 13, respectively, engaging with differential tooth pinions 14 on the spider 15 splined to the input shaft 5, whereby the elements 10 and 11 may be driven differentially from the input shaft. To lock out the differential action the opposite end of the element 10 is provided with external clutch teeth 16 for engagement with internal clutch teeth 17 of a slider 18 splined to the shaft 5 and which engagement causes the slider 18, the element 10, the spider 15 and the element 11 to rotate as a unit.

Both gear elements 10 and 11 are geared for drive connection with each of the output shafts 8 and 9, the arrangement being such that either of two speed ratios may be had. The low speed gear 19 on the element 10 and the low speed gear 20 on the element 11 are identical and the high speed gears 21 and 22 on the respective elements are also identical. A gear 23 rotatably mounted on the shaft 9 meshes with the low speed gear 19 and a similar gear 24 rotatable on the output shaft 8 meshes with the other low speed gear 20. The shaft 8 also has rotatably mounted thereon a gear 25 meshing with the high speed gear 21 and a similar gear 26 meshing with the high speed gear 22 is rotatable on the shaft 9. Splined on the shaft 9 between the gears 23 and 26 is a slidable coupler 27 provided at opposite ends with external clutch teeth 28 and 29 selectively engageable with internal clutch teeth 30 and 31 on the respective gears. A like coupler 32 is splined on the shaft 8 and carries external clutch teeth 33 at one end for engagement with the internal clutch teeth 34 on the gear 24 and external clutch teeth 35 at its opposite end for coupling with the internal teeth 36 on the gear 25.

For operating the output shaft 7 the driving gear 37 is keyed or otherwise fixed to the shaft 9 and meshes with a gear 38 in a ratio of one to one. This gear 38 which is rotatably mounted on the shaft 7 carries internal clutch teeth 39 for coupling with the external teeth 40 of the slidable collar 41 splined on the shaft 7.

It will be apparent that through the several clutching devices various combinations of drive relations may be established. If the vehicle is to be equipped with but two drive axles the shaft 7 and its gear train would be omitted and should it be desired to place the unit between a pair of drive axles located at opposite ends of the vehicle one of the shafts 8 and 9 would be extended rearwardly and the other forwardly. At the moment the intention is to arrange the controls so that any one of three drive relations may be effected.

In one setting only the two rear axles are driven through the differential in high speed gearing; in another setting the rear axles only are driven through the low speed gearing with the differential free, and in the remaining setting all three axles are driven through the low speed gearing with the differential locked out.

Figure 2 illustrates the parts for high speed drive through the differential to the rear axles only, the slidable clutches 18 and 41 being released and the clutches 27 and 32 coupling the gear 26 with the output shaft 9 and the gear 25 with the output shaft 8. The transmission of power from the input shaft 5 is divided through the differential gearing 12, 13 and 14, part going from the gearing element 10 through gears 21 and 25 to the output shaft 8 and the remainder from the gearing element 11 through the gears 22 and 26 to the output shaft 9. For low speed drive to the rear axles through the differential the clutches 18 and 41 are left in released position and both sliders 27 and 32 are shifted into coupling relation with the gears 23 and 24, respectively, the power then passing through the differential and partly through the gears 19 and 23 to the shaft 9 and partly through the gears 20 and 24 to the shaft 8. For drive in low gear with the differential locked, the gears 23 and 24 are coupled to their respective shafts and the slider 18 is shifted to engage the clutch teeth 16 and 17 in which case the elements 10 and 11 and the differential mechanism rotate together driving the shafts 8 and 9 through the gears 24 and 23. Concurrently with the setting of the clutch 18 the clutch 41 may be shifted to couple the gear 38 with the output shaft 7 through the teeth 39 and 40 so that the shaft 7 is driven through the gear 37 at the same rate of speed as are the shafts 8 and 9.

For positioning the parts in the several driving relations mentioned, hand controlled shifter forks may be employed. Thus the sliding clutches 27 and 32 are each provided with annular grooves 42 and 43 to receive shifter forks 44 and 45 mounted on the slidable rods 46 and 47.

The two rods are interconnected by a rocking lever 48 so that as one moves toward the right the other moves simultaneously toward the left and vice versa, whereby the sliders 27 and 32 are moved in unison to couple the respective high speed and low speed gears as before described. The clutches 18 and 41 are similarly provided with annular grooves 49 and 50 to receive the shifter forks 51 and 52 mounted on the same slide rod 53 so that the clutches 18 and 41 are moved concurrently in the same direction for the coupling and uncoupling operations.

For moving the shift rods they are extended to the driver's position, the extension in the case of the rod 53 being in the form of a rocking lever 54 and a rod 55 and both extensions are provided with notches adapted for selective engagement with the head 56 on a hand shift lever 58. This hand lever 58 is mounted for rocking and transverse sliding movement on a pin 59 in a mounting tower 60 and extends through a Z-shaped slot 61 in the top of the tower which guides the hand lever to any one of its three gear setting positions. For setting the parts in the relation shown in Figure 2 the hand lever is moved from the intermediate position shown in Figure 4 to one side and then moved forward in the slot 61. The side movement of the lever brings the head 56 into engagement with the notch of the forward end of the rod 46 and the subsequent rocking movement of the lever slides the rod toward the right as shown in Figure 3 and through the rock lever 48 slides the rod 47 toward the left. This positions the parts for drive through the differential to the rear axles in the high speed range. When the lever is set to the intermediate position as in Figure 4 the rods 46 and 47 are restored and are positioned so that the gear 23 is coupled to the shaft 9 and the gear 24 is coupled to the shaft 8 which gives the low speed drive through the differential to the pair of rear axles. The rod 55 is shifted by first moving the hand lever 58 transversely and then back in the slot 61, pulling the rod 55 toward the left in Figure 3 and through the rock lever 54, shifting the rod 53 toward the right, which causes the clutches 18 and 41 to be moved simultaneously to coupling position thereby locking out the differential and driving all three axles through the low speed gears.

For a more compact arrangement of the gearing and to enable the use of an auxiliary adapter as optional equipment for converting a four wheel drive mechanism into a six wheel drive arrangement, the structure as shown in Figure 5 has been provided. In this instance the arrangement of the input and output shafts and associated gearing is substantially that of Figure 2 except that the ger 37 has been omitted and is replaced by a spacer collar 62. The casing 6a in this instance has an opening at one side for attachment of the casing 63 forming a part of the optional assembly and in which is mounted on suitable bearings the output shaft 7a for the front axle. This shaft has rotatably mounted thereon a gear 64 to mesh with the low speed driven gear 23 of the output shaft 9. The gear 64 carries internal clutch teeth to engage with the external clutch teeth of the slider 65 splined on the shaft 7a and having an annular groove 66 to receive a shifter fork 67 on a slide rod 55a. This slide rod 55a may be formed as an extension of the shifter rod 55 previously referred to and which is connected by the rock lever 54 with the slide rod 53. In this instance as the rod 53 is moved toward the right in Figure 3 to lock out the differential the rod 55 simultaneously moves toward the left and shifts the clutch 65 to couple the gear 64 with the output shaft 7a. The construction and operation is otherwise as before described.

The structure in Figure 6 also embodies as optional equipment a drive for the front axle in addition to the drive for tandem rear axles. In this instance, however, the gearing is such that the three speed settings involve high and low ranges, both with the differential locked and additionally a high range with the differential free. With three driving axles, all three axles may be driven with the differential locked in either high or low range, the front axle being cut out only in the high range with the drive through the differential. Referring more particularly to the structure shown in Figure 6 the input shaft is shown at 70, the output shaft for the front axle at 71 and the output shafts for the rear axles at 72 and 73. Each of these shafts is mounted at opposite ends in suitable bearings in the housings 74 and 75. The input shaft 70 has a differential spider 76 splined thereon with differential pinions 77 engaging side gears 78 and 79 on a pair of high speed gears 80 and 81. The gear 81 is in mesh with a gear 82 keyed or otherwise fixed on the output shaft 73 while the gear 80 meshes with a gear 83 rotatably mounted on the output shaft 72 and adapted to be clutched to the shaft by a slider 84 splined on the shaft. The gear 81 is also in mesh with a gear 85 which is formed integral with a gear 86 meshing with a gear 87 rotatably mounted on the input shaft 70. A slider 88 splined on the shaft 70 is adapted to couple with clutch teeth formed on the gear 87 and a slider 89 splined on the output shaft 72 couples the shaft with the integrally formed gears 85 and 86. The gear 85 is also in drive engagement with a gear 90 rotatably mounted on the output shaft 71 and adapted to be coupled thereto through a sliding clutch 91 splined on the shaft.

Each of the clutches 84, 89, 88 and 91 is provided with an annular groove for engagement with a shifter fork for setting the parts in various drive relations. The several shifter forks and control rods are shown by broken lines. That which operates the clutch 91 is mounted on a slide rod 92 connected by a rock lever 93 with the slide rod 94 which carries the shifter fork for the clutch 89 and extends forwardly to the manually controlled shift lever. The clutch 88 has its shifter fork mounted on a rod 95 which is connected by a rock lever 96 to the shift rod 98 which carries the shifter fork for the clutch 84 and extends forwardly beside the rod 94 for manual actuation. The hand lever in this instance may be that shown in Figure 4 and when the lever is in the intermediate or central position as seen in Figure 4 the position of the drive mechanism is that shown in Figure 6. In this instance the differential is locked out of action since both clutches 84 and 89 are in coupling relation to the gears 83 and 85 meshing with the differential gears 80 and 81. The drive, therefore, is from the input shaft 70 through the spider 76 to both gears 80 and 81 driving the output shaft 73 through the gear 82 and the output shaft 72 through the gears 83 and 85 coupled thereto. In addition the gear 85 drives the gear 90 which is in coupled position with the output shaft so that all three axles are driven.

In the event the hand shift lever 58 is moved forward in the slot 61 the shift rod 94 is moved rearwardly disengaging the clutch 89 from the gear 85 and simultaneously moving the rod 92 forwardly to disengage the clutch 91 from the gear 90. In this relation of parts the front axle receives no power and the drive to the tandem rear axle is in high speed through the differential. The power then flows from the input shaft 70 through the differential mechanism, part going through the gears 81 and 82 to the output shaft 73 and the remainder through the gears 80 and 83 to the output shaft 72, the gear 85 rotating freely.

Shifting the hand lever 58 rearwardly in the slot 61 from the intermediate position causes the rod 98 to move forwardly and uncouple the clutch 84 between gear 83 and output shaft 72 and simultaneously shifts the rod 95 rearwardly to couple the clutch 88 with the gear 87. At such time the clutches 89 and 91 are both in coupling position and the drive is then in low gear to all axles with the differential action cut out. The flow of power is from the input shaft 70 through the gear 87 into the gear 86, driving the output shaft 72 through the clutch 89, the output shaft 71 through the gears 85 and 90 and clutch 91, and driving the output shaft 73 through the gears 81 and 82, the differential action being cut out by the disengagement of the clutch 84.

I claim:

1. In a variable speed power divider, an input shaft, differential drive mechanism associated therewith including a pair of side gear elements rotatably mounted on the shaft, a high speed gear and a low speed gear on each element, a slidable clutch selectively operable to couple one of said elements to the shaft and thereby cut out the differential action between said elements, a pair of output shafts, each having rotatably mounted thereon a high speed gear in mesh with the high speed gear of one of said elements and a low speed gear in mesh with the low speed gear of the other of said elements, and slidable clutch means on each output shaft to couple thereto the respective gears thereon.

2. In a variable speed power divider, a pair of output shafts, each having high and low speed gears rotatably mounted thereon and a slider splined thereto between said gears for clutching engagement with the respective gears, an input shaft having a pair of gear elements rotatably mounted thereon, each element having rigid therewith a high speed gear in mesh with the high speed gear on one of the output shafts and a low speed gear in mesh with the low speed gear on the other output shaft, differential drive means between said elements and the input shaft, and a slidable clutch splined on the input shaft for selective engagement with one of said elements to lock out the differential drive means.

3. In a variable speed power divider, a pair of output shafts, each having high speed and low speed gears rotatably mounted thereon and a slider clutch splined thereto for movement in opposite directions to couple one or the other gears to the shaft, means for simultaneously shifting both clutches to engage either the high speed gears or the low speed gears in unison, an input shaft having a pair of gear elements rotatably mounted thereon, and each element carrying high and low speed gears meshing with mating gears on the output shafts, differential drive means between said elements and the input shaft, a clutch for coupling one of the elements with the input shaft, and means to engage and disengage said clutch.

4. In a variable speed power divider, an input shaft, a pair of differentially driven gears rotatably mounted on said shaft, an output shaft having rigid therewith a gear in mesh with one of said differentially driven gears, a second output shaft having rotatable thereon a pair of gears in mesh with said pair of differentially driven gears, clutch means to drive connect said rotatably mounted gears and the second output shaft in selected relations, a low speed gear rigid with one of said rotatably mounted gears, a driving gear meshing with said low speed gear and being rotatably mounted on the input shaft and clutch means selectively operable to couple said driving gear with the input shaft.

5. In a variable speed power divider, a pair of output shafts, each having high and low speed gears rotatably mounted thereon and clutch means for coupling said gears to the shafts, a third output shaft having rotatably mounted thereon a gear in mesh with one of the beforementioned gears and means to clutch the same to said shaft, an input shaft having a pair of differentially driven gear elements rotatably mounted thereon and each having high and low speed gears meshing with the mating gears on said output shafts and means to clutch said elements for solid drive with said input shaft.

6. In a variable speed power divider, an input shaft having a pair of differentially driven gear elements thereon, each provided with high and low speed gearing means to couple said elements for solid drive with the shaft, a pair of output shafts each having high and low speed gears meshing with the mating gearing of said elements, selective means for coupling the respective output shafts with either the high or low speed gears thereon, a third output shaft having a gear rotatably mounted thereon, a driving gear in mesh therewith and rigidly mounted on one of the said pair of output shafts and clutch means for coupling said third output shaft with the gear carried thereby.

7. In a power divider unit, an enclosing housing, a drive shaft and a pair of driven shafts all rotatably supported within the housing in spaced parallelism, a differential spider fixed on the drive shaft and provided with differential pinions, a pair of differential side gears rotatably journaled on the drive shaft in engagement with said pinions, change speed drive transmitting mechanism between the side gears and the driven shafts, respectively, and means selectively operable to lock the differential side gears in non-rotatable relation to the drive shaft.

CARL J. BOCK.